(12) United States Patent
Adams et al.

(10) Patent No.: US 12,140,264 B2
(45) Date of Patent: Nov. 12, 2024

(54) PIPES FOR CARRYING WATER

(71) Applicant: Wet Holdings (Global) Limited, Reading (GB)

(72) Inventors: Michael Adams, Solihull (GB); Ahmed Mohamed, Birmingham (GB); Paul Gregory, Coventry (GB); Darren Bradley, Henley in Arden (GB)

(73) Assignee: Wet Holdings (Global)Limited, Reading (GB)

( * ) Notice: Subject to any disclaimer, the term of this patent is extended or adjusted under 35 U.S.C. 154(b) by 320 days.

(21) Appl. No.: 17/600,821

(22) PCT Filed: Apr. 2, 2020

(86) PCT No.: PCT/GB2020/000037
§ 371 (c)(1),
(2) Date: Oct. 1, 2021

(87) PCT Pub. No.: WO2020/201667
PCT Pub. Date: Oct. 8, 2020

(65) Prior Publication Data
US 2022/0178474 A1    Jun. 9, 2022

(30) Foreign Application Priority Data

Apr. 3, 2019    (GB) .................................... 1904674

(51) Int. Cl.
| | |
|---|---|
| *F16L 9/00* | (2006.01) |
| *B29D 23/00* | (2006.01) |
| *B33Y 80/00* | (2015.01) |
| *F16L 9/133* | (2006.01) |
| *B29K 27/06* | (2006.01) |

(52) U.S. Cl.
CPC ............ *F16L 9/006* (2013.01); *B29D 23/001* (2013.01); *B33Y 80/00* (2014.12); *F16L 9/133* (2013.01); *B29K 2027/06* (2013.01)

(58) Field of Classification Search
CPC ............... F16L 9/00; F16L 9/006; F16L 11/11
USPC ..................................... 138/121, 122, 39, 37
See application file for complete search history.

(56) References Cited

U.S. PATENT DOCUMENTS

| | | | | |
|---|---|---|---|---|
| 790,517 | A * | 5/1905 | Miller et al. ............ | F16L 57/02 138/131 |
| 1,451,272 | A * | 4/1923 | Robinson .................. | E02F 7/10 406/92 |
| 3,224,814 | A * | 12/1965 | Fisher ..................... | F15D 1/065 285/179 |
| 4,248,179 | A * | 2/1981 | Bonner ................. | F28F 13/185 165/184 |

(Continued)

FOREIGN PATENT DOCUMENTS

| | | |
|---|---|---|
| CN | 107163343 | 9/2015 |
| JP | 06249370 | 9/1994 |

(Continued)

*Primary Examiner* — Patrick F Brinson
(74) *Attorney, Agent, or Firm* — Renner, Kenner, Greive, Bobak, Taylor & Weber (57) ABSTRACT

A water delivery pipe made from PVC or PVCO and having an inner surface which is rifled. The inner surface of the pipe preferably includes a graphene material. The pipe has improved anti-bacterial properties such that the formation of bacterial biofilms is eliminated or reduced.
Methods of making the pipe are also disclosed.

19 Claims, 12 Drawing Sheets

(56) References Cited

U.S. PATENT DOCUMENTS

| | | | | |
|---|---|---|---|---|
| 4,710,736 | A * | 12/1987 | Stidwell | H01P 3/14 333/241 |
| 6,116,289 | A * | 9/2000 | Hayashi | F16L 11/11 138/121 |
| 6,131,616 | A * | 10/2000 | Tatsuta | F16L 11/11 138/155 |
| 6,453,593 | B1 * | 9/2002 | Dillon | F41A 21/16 42/76.01 |
| 6,662,860 | B2 * | 12/2003 | Iwamoto | F28F 1/32 165/184 |
| 6,789,579 | B1 * | 9/2004 | Ryhman | B29C 48/09 138/121 |
| 7,322,379 | B2 * | 1/2008 | Evans | B29C 48/337 138/121 |
| 8,443,845 | B2 * | 5/2013 | Tomlin | A61B 90/39 138/104 |
| 9,982,693 | B2 * | 5/2018 | Nord | F15D 1/009 |
| 11,378,110 | B1 * | 7/2022 | Schmidt | F15D 1/02 |
| 2004/0007278 | A1 * | 1/2004 | Williams | B29C 48/09 285/903 |
| 2006/0005892 | A1 * | 1/2006 | Kuo | F15D 1/02 366/338 |
| 2014/0023812 | A1 | 1/2014 | Hammer et al. | |

FOREIGN PATENT DOCUMENTS

| | | |
|---|---|---|
| KR | 101787895 | 10/2017 |
| WO | 8804888 | 7/1988 |

* cited by examiner

Aii

Bii

Cii

Dii

Eii

Fii

Gii

Hii

PIPES FOR CARRYING WATER

FIELD OF THE INVENTION

The present invention relates to the field of water supply pipes and, in particular, the invention relates to PVC and PVCO pipes.

BACKGROUND OF INVENTION

Polyvinyl chloride (PVC) was discovered in the late nineteenth century. Science and technology then slowly evolved for the use of the PVC in its unplasticised, rigid form, which today is used in the production of a great many extruded and molded products. Some PVC pipes have been in use since the 1930s and the molecularly oriented polyvinyl chloride (PVCO) pressure pipes have been used in Europe since the 1970s and the United States since 1991. Nowadays, PVC, including PVCO, is the third most widely produced synthetic plastic polymer and is the most commonly used material for plumbing, drainage and water supply pipes.

The properties and characteristics of polyvinyl chloride pipes and fabricated fittings are derived from the properties of their raw materials. Essentially, PVC pipes and fabricated fittings are manufactured from PVC extrusion compounds. Injection molded fittings use slightly different molding compounds. PVCO, on the other hand, is manufactured from conventional PVC extrusion compounds. Polyvinyl chloride resin, the basic building block of PVC pipe, is a polymer derived from petroleum or natural gas, salt water and air. PVC resin is produced by any of the common manufacturing processes (bulk, emulsion or suspension), and is combined with heat stabilizers, lubricants and other ingredients to make PVC compound that can be extruded into pipe or molded into fittings.

PVC and PVCO pipes are resistant to almost all types of corrosion—both chemical and electrochemical—that are experienced in underground piping systems. Because PVC is a nanoconductor, galvenic and electrochemical effects are non-existent in PVC piping systems. PVC pipes cannot be damaged by aggressive waters or corrosive soils. Also, PVC pipes can be installed properly over the ambient temperature range in which construction workers operate. However, changes in temperature (above or below ambient) can induce different effects on PVC pipes. For example, as the temperature increases, the impact strength and flexibility of PVC pipes increase. Conversely, as the temperature decreases, the tensile strength and stiffness of PVC pipes increase, thereby increasing the pipes' pressure capacity and their ability to resist earth-loading deflections. Additionally, soluble encrustants (such as calcium carbonate) in some water supplies do not precipitate onto the smooth walls of PVC or PVCO pipes. So, because these materials do not corrode, there is no tuberculation caused by corrosion by-products. On the other hand, research has indicated that PVC pipe materials may be subject to permeation by lower molecular weight organic solvents or petroleum products and can incur surface damage when subjected to long-term exposure to UV radiation from sunlight.

Generally, PVC and PVCO pipes require no lining, coating, cathodic protection, or plastic encasement due to their superior physical and chemical properties. However, the biological and anti-microbial properties of PVC and PVCO pipes have been subjected to enormous scrutiny due to the reported bacterial colonisation and growth on the inside lining or inner surfaces of PVC and PVCO pipes. In fact, some studies indicated that bacterial biofilms are formed in the inner surfaces of the PVC and PVCO pipes. Although PVC and PVCO pipes are resistant to biological attacks inflicted by living micro-organisms, bacterial biofilms can contaminate the flowing water inside the pipes with various types of bacteria which, in turn, can cause detrimental effects on the health of consumers. For instance, in the agricultural industry, PVC or PVCO pipes are the pipes of choice for water supply for farmed poultry and livestock. Bacterial contamination of drinking water has been attributed to as one of the key routes for crop disease, loss of performance and economic loss. According to FAO surveys, 20% of farmed poultry and livestock is lost due to disease in which contaminated water is considered as a key contributory factor.

STATEMENTS OF THE INVENTION

According to the present invention, there is provided a water delivery pipe made from PVC or PVCO and having an inner surface which is rifled.

The term "rifled" is used herein to mean the arrangement of grooves on the inside of the pipe.

The rifling of the inner surface of the PVC or PVCO pipes causes the delivered water to flow in a vortex or a whirling motion in which the delivered water flow revolves around the bore axis line.

Preferably, the inner surface comprises a graphene material, for instance, graphene or graphene oxide. The term "graphene material" means graphene or a graphene derivative. The graphene material may be present in a coating within the PVC or PVCO pipe or it may extend throughout the wall of the pipe.

The family of graphene-based materials have been extensively studied and used for various applications due to their unique chemical and physical properties, such as ease of preparation, renewability and having unique catalytic properties and exceptional physical properties such as a large specific surface area and mechanical strength, electrical and thermal conductivity and their light weight. Graphene, which is a two-dimensional (2D) nano-structure consisting of sp2 carbons, is a building block of several carbon allotropes including charcoal, bucky balls, carbon nanotubes and graphite. Since its discovery in 2004, graphene emerged as a promising nanomaterial because of its unique electrical, catalytic, and optical, properties as well as exceptional physical properties such as mechanical strength and a large specific surface area. Additionally, graphene is cheap, renewable, and easier to prepare compared to other nanomaterials.

Graphene Oxide (GO) is the oxidized form of graphene having abundant oxygen bonds on its edges and defective sites, such as hydroxyl (OH), carbonyl (—C=O) and carboxylic (—COOH) groups on both accessible sides.

Reduced graphene oxide (rGO) nanosheets are prepared by reducing GO nanosheets with dithiothreitol, hydrazine, and betamercaptoethanol. The rGO-based materials exhibit unique electronic, thermal, electronic, and mechanical properties.

Preferably, the pipe has a circular or rectangular cross section.

Preferably, the inner surface of the pipe comprises grooves arranged in a spiral configuration around the longitudinal axis of the pipe. The grooves may be, for instance, rectangular, including square, octagonal, semi-lunar (or semi-circular), semi-triangular or wave profile in cross section.

Preferably, grooves form a series of sawtooth arrangements having positive and negative ramps. More preferably, the positive ramps are concave in shape and the negative ramps have steep edges which are perpendicular to the wavelength.

Holes or punctures may be provided along the pipe and drinking nipples, which may be coated with graphene material, provided at these holes or punctures.

In a pipe according to the present invention, the water being delivered may be caused to swirl in a whirlpool pattern. The whirlpool patter may be a clockwise or anti-clockwise whirlpool pattern.

Furthermore, the delivered drinking water may be caused to swirl and mix to ensure water aeration and to prevent clogging of the pipes.

The nature of the water flow in the pipe is such that the formation of bacterial biofilms on the inner surface of the pipe is reduced or eliminated.

A pipe of the invention may be used for delivering any type or quality of water including drinking water and pharmaceutical grade water.

The present invention also provides a method of making a water delivery pipe made from PVC or PVCO and having an inner surface which is rifled, the method comprising providing a PVC or PVCO pipe and rifling the inner surface of the pipe.

The pipe may be made by, for instance, injection moulding or 3D printing.

Preferably, after the inner surface of the pipe is rifled, a graphene material is applied thereto.

The graphene material may be applied to the inner surface of the pipe by, for instance, a coating or doping process.

The pipe may be made by a 3D printing process which comprises successive printing of PVC or PVCO layers, rifled PVC or PVCO layers and graphene material layers.

The graphene material may extend throughout the wall of the pipe so that the pipe is, in effect, a graphene material reinforced PVC or PVCO pipe. Such a pipe may be made by, for instance, injection moulding which can create the rifling profiles during the pipe production. The graphene material is mixed with PVC or PVCO in addition to other chemicals including, but not limited to, stabilizers, coupling agents and binding agents which are then thermally and chemically treated.

In summary, the present invention is concerned with the surface of PVC or PVCO the pipe which lines the bore of the pipe and comes in contact with the passing or delivered water. In a preferred embodiment, this inner surface comprises graphene or graphene oxide or any other graphene-related material which provides the inner surface with anti-bacterial properties and therefore helps prevent the formation of a biofilm on the inner surface of the pipe. Furthermore, the addition of the graphene-related material improves the structural integrity of the PVC or PVCO pipes and generally improve their physical and chemical properties.

The rifling of the inner surface cause the delivered water to move in a vortex or whirling motion with the aim to enhance water aeration and to act as a self-cleansing method by preventing clogging of the pipes and further prevent the formation of a biofilm.

The above-mentioned square profile grooves may comprise U-shaped three-walled grooves having one horizontal wall that is perpendicular to two parallel vertical walls, the walls being of equal length. A non-square rectangular profile may be a U-shaped three-walled groove comprising one horizontal wall that is perpendicular to two parallel vertical walls. The horizontal wall may be longer than the vertical walls.

The semi-triangular profile may be a U-shaped, three-walled groove comprising two vertical walls that connect to one horizontal wall at acute angles. The length of each of the walls may vary.

The octagonal profile may be a U-shaped three-walled groove comprising two vertical walls that connect to one horizontal at obtuse angles. The length of each of the walls may vary. The design of the octagonal profile is similar to the Hybrid Rifling Profile for barrels.

The semi-circular profile may be a semi-lunar shaped U-shaped groove which is similar to the Polygonal Rifling Profile for barrels.

The wave profile may be a sawtooth series of concentric wave-like arrangements with positive ramps which are concave in shape and negative ramps having steep edges which are perpendicular to the wavelength.

The profiles of the rifling may affect the characteristics of the speed and vortex or whirling motion of the delivered water. For instance, the number of continuous grooves varies and a preferred number is in the range from 2 to 8 per pipe. The width, depth and height of the said grooves and lands may vary according to the dimensions and the length of the pipes and the volume and pressure of the delivered water.

The pipes of the invention may be produced or manufactured at any length, for instance, 0.5 metre, 1 metre, 2 metres or more. The pipes may be produced or manufactured with any cross-sectional dimensions. For instance, pipes with a rectangular cross-section may be 22 mm×22 mm and pipes with a circular cross-section may have a diameter of 20 mm.

A key characteristic of the rifling profiles of the said PVC or PVCO pipes in the present invention is the twist rate which describes the distance said pipes take to complete one revolution. In accordance with this present invention, the said rifled PVC or PVCO pipes may be produced or manufactured with any twist rate, including 1 revolution in 5 inches (1:5 inches), 1 revolution in 10 inches (1:10 inches), 1 revolution in 48 inches (1:48 inches) or any other twist rates. Additionally, the said rifled PVC or PVCO pipes in this present invention may have a constant twist rate or a gain twist rate. For example, in the rifled PVC or PVCO pipes with constant twist rate, the twist rate remains constant throughout the whole pipe. For instance, rifled PVC or PVCO pipes in accordance with this present invention may have a 1:5 inch twist turn throughout the whole said pipe. On the other hand, in rifled PVC or PVCO pipes with gain twist rate, the twist rate may vary from one point to another inside the said pipes. For instance, a rifled PVC or PVCO pipe in accordance with this present invention may have a twist turn of 1:5 inches on one end of the said pipe, a 1:10 inch twist rate in the middle of the said pipe, and a 1:48 inch twist rate at the end of the said pipe.

The continuous groove embodiments may revolve around the bore axis line in a clockwise or anti-clockwise pattern.

Preferably, the holes or punctures are rectangular or round and spaced apart at varying distances, including 20 cm distance apart. Preferably, drinking nipples containing graphene or graphene oxide are attached to these holes.

BRIEF DESCRIPTION OF THE DRAWINGS

The accompanying drawings are as follows:

FIG. 1*ii* is a diagrammatic representation of cross sections and longitudinal sections of an eight-grooved square profile graphene or graphene oxide or any other graphene material containing rifled PVC or PVCO pipe in accordance with the present invention;

FIG. 2*ii* is a diagrammatic representation of cross sections and longitudinal sections of an eight-grooved rectangular profile graphene or graphene oxide or any other graphene material containing rifled PVC or PVCO pipe in accordance with the present invention;

FIG. 3*ii* is a diagrammatic representation of cross sections and longitudinal sections of eight-grooved semi-triangular profile graphene or graphene oxide or any other graphene material containing rifled PVC or PVCO pipe in accordance with the present invention;

FIG. 4*ii* is a diagrammatic representation of cross sections and longitudinal sections of eight-grooved octagonal profile graphene or graphene oxide or any other graphene material containing rifled PVC or PVCO pipe in accordance with the present invention;

FIG. 5*ii* is a diagrammatic representation of cross sections and longitudinal sections of eight-grooved semi-circular profile graphene or graphene oxide or any other graphene material containing rifled PVC or PVCO pipe in accordance with the present invention;

FIG. 6*ii* is a diagrammatic representation of cross section showing details of Wave-like embodiments of a wave profile graphene or graphene oxide or any other graphene material containing rifled PVC or PVCO pipe in accordance with the present invention.

DETAILED DESCRIPTION OF THE INVENTION

The invention will now be described, by way of examples, with reference to the accompanying drawings.

Figure 1:
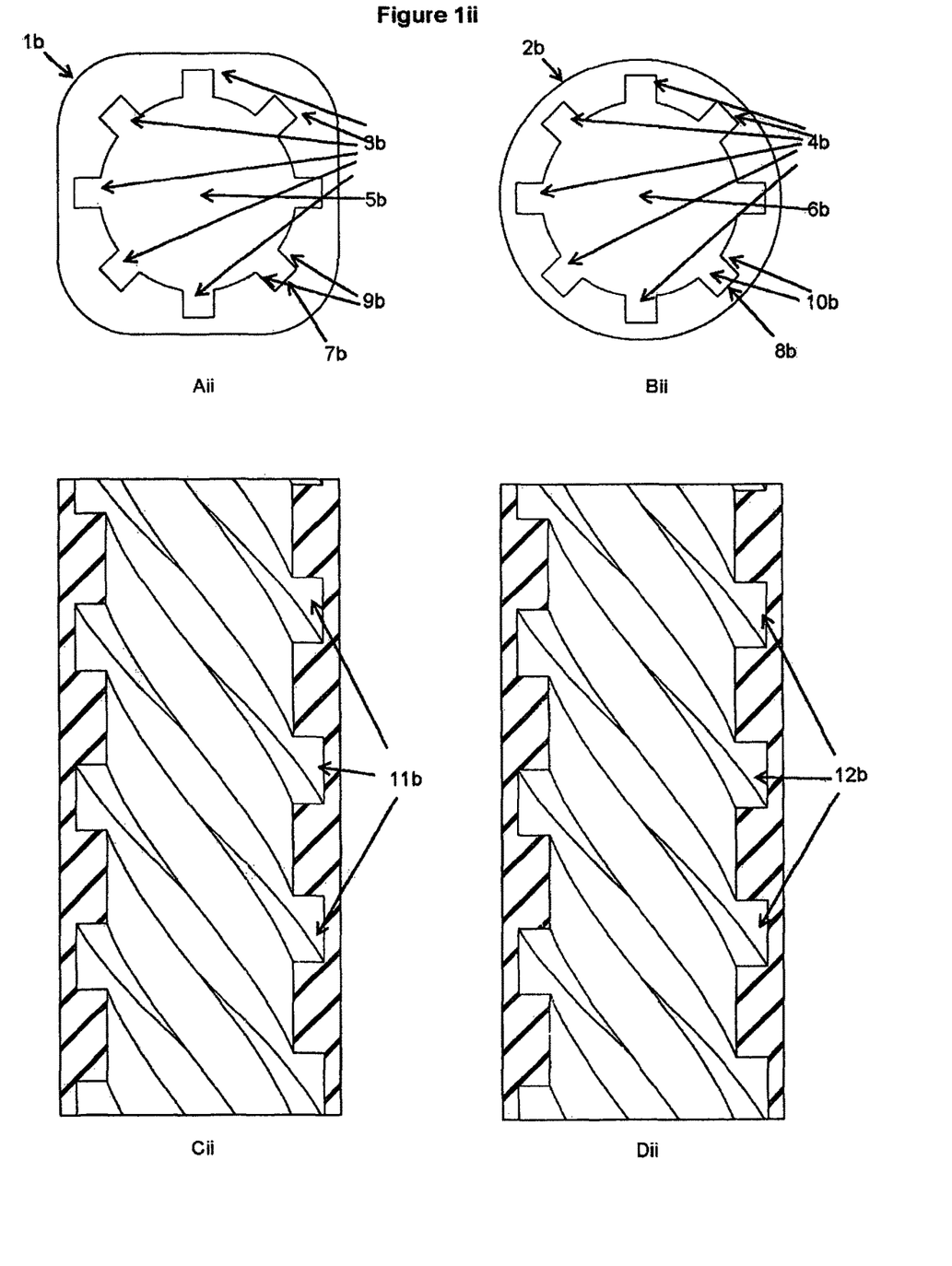
Figure 1I:
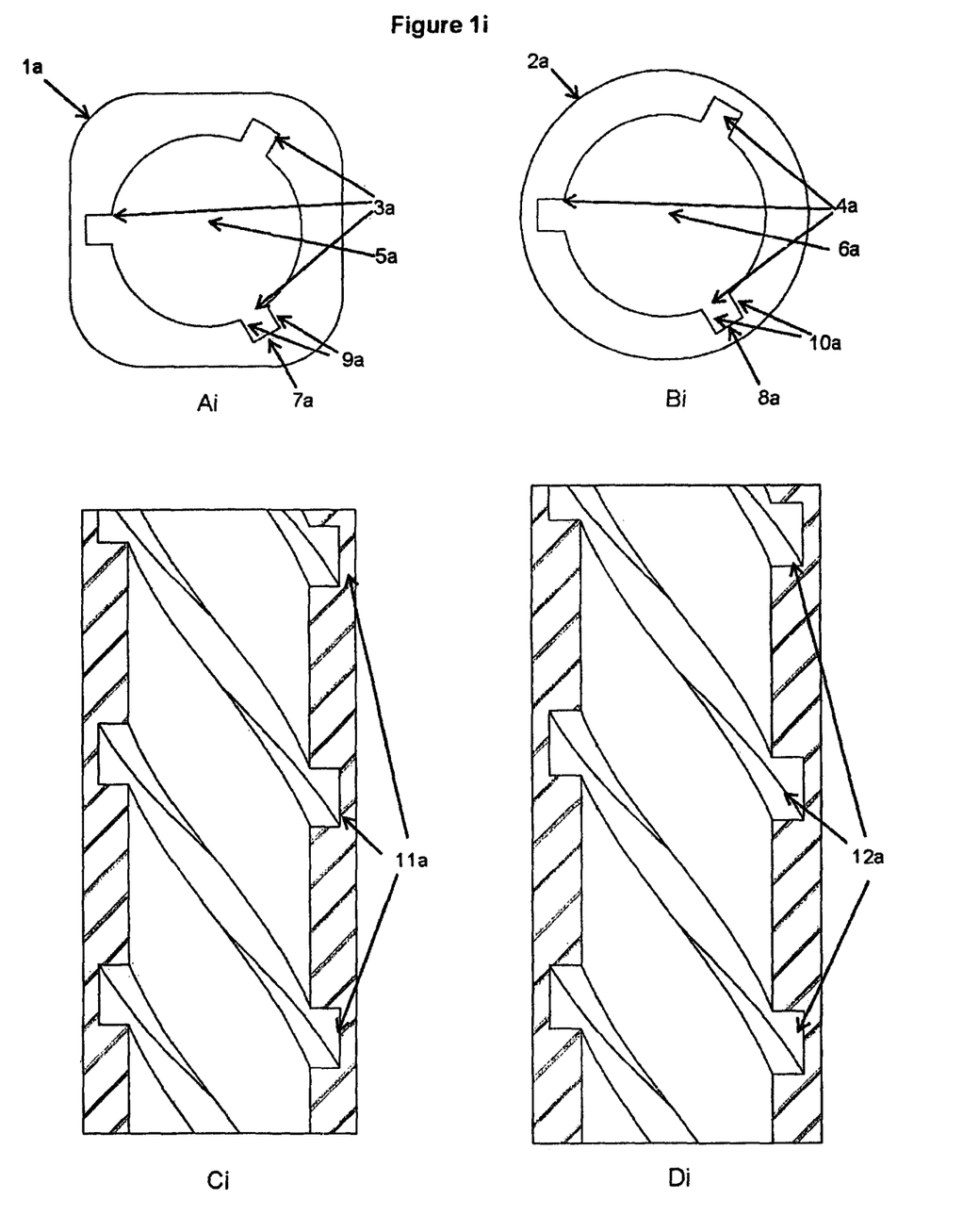
FIG. 1i is a diagrammatic representation of cross sections and longitudinal sections of a three-grooved square profile graphene or graphene oxide or any other graphene material containing rifled PVC or PVCO pipe in accordance with the present invention.

Referring to FIGS. 1*i* and 1*ii* of the accompanying drawings, there are shown examples of square profile rifled PVO or PVCO pipes that comprise graphene or graphene oxide or any other graphene material. In the present invention, the cross-section of the outer surface of the square profile of the said pipes, Ai-ii and Bi-ii, may either be a rectangular cross-section Ai-ii or round cross-section Bi-ii. On the other hand, the inner surface of the said pipes, which faces the bore of the said pipes, comprises graphene or graphene oxide or any other graphene material and comprise square-shaped grooves 3*a-b* and 4*a-b* that continuously run throughout the length of the pipe in a spiral motion around the bore axis line 5*a-b* and 6*a-b*. The twist rate of the said continuous spiral grooves in this square profile varies including, but not limited to, 1:5 inch or 1:10 inch or 1:48 inch constant twist rates or any other constant twist rates. Alternatively, the twist rate of the said continuous spiral grooves may have a gain twist rate.

The square profile may have three grooves 3*a* and 4*a* or eight grooves 3*b* and 4*b* or any other number of grooves, depending on the dimensions of the pipes. The grooves 3*a-b* and 4*a-b* may comprise U-shaped 3 walled (in cross section) grooves comprising of one horizontal wall 7*a-b* and 8*a-b* that is perpendicular to two parallel vertical walls 9*a-b* and 10*a-b*. The walls of the grooves may be of equal length. The dimensions of the grooves vary according to the dimensions of the pipe.

The longitudinal sections of the square profile, Ci-ii and Di-ii, show the rifled PVC or PVCO pipes that comprise graphene or graphene oxide or any other graphene material. The continuous spiral square shaped grooves facing the bore axis lines are shown at 11*a-b* and 12*a-b*. The square shaped cross section of the said grooves are also shown.

Figure 2:
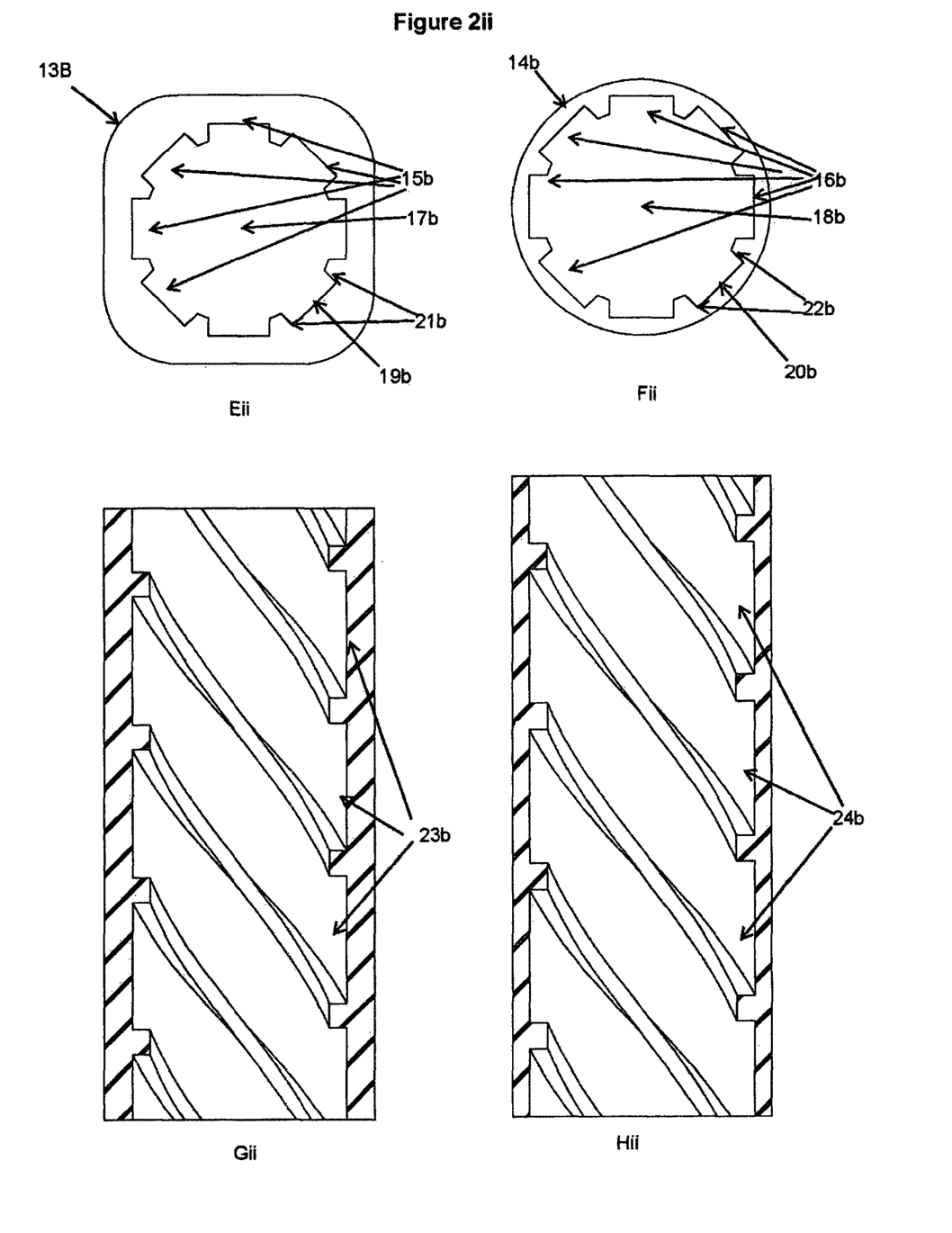
Figure 2I:
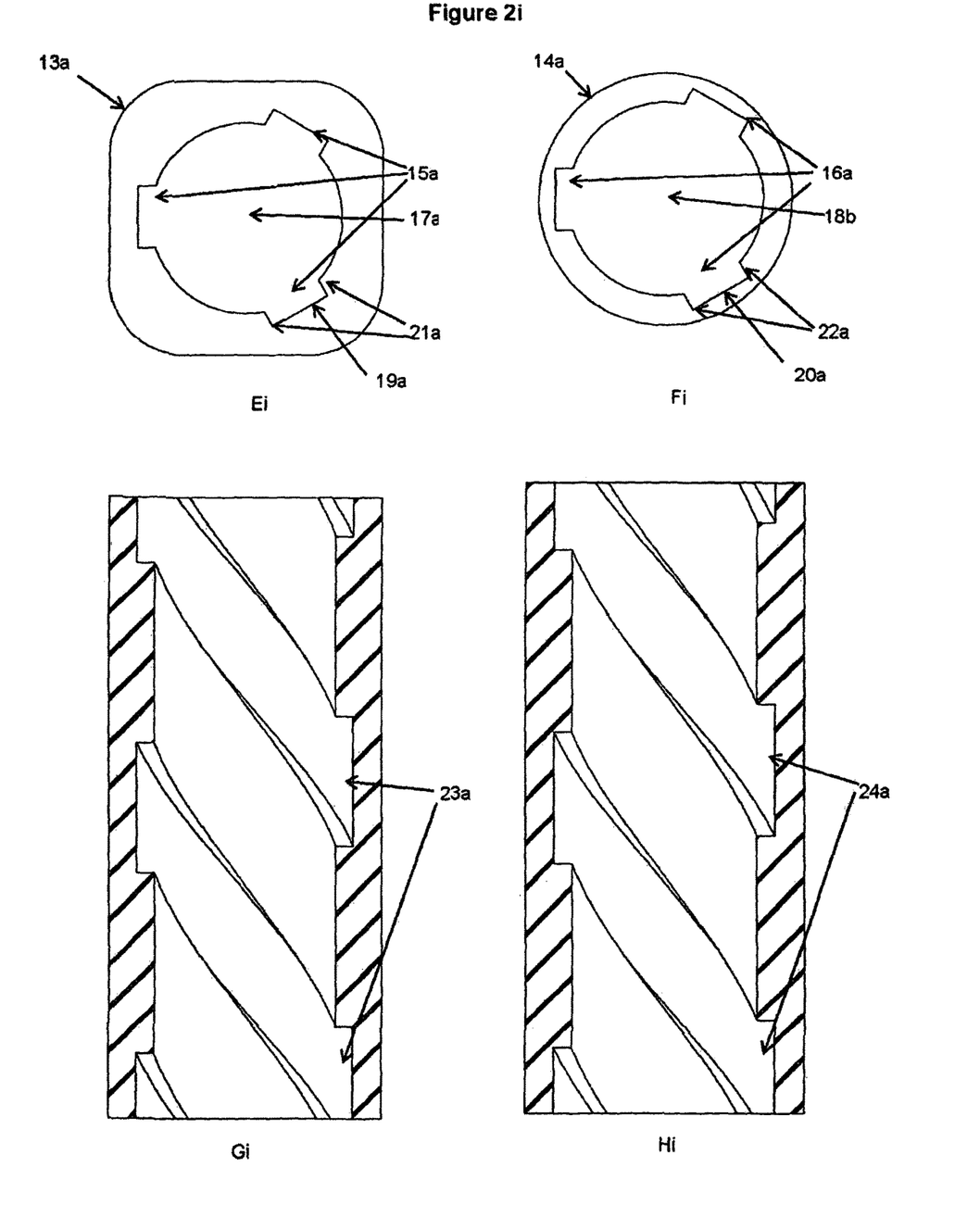
FIG. 2*i* is a diagrammatic representation of cross sections and longitudinal sections of three-grooved rectangular profile graphene or graphene oxide or any other graphene material containing rifled PVC or PVCO pipe in accordance with the present invention.

Referring to FIGS. 2*i* and 2*ii* of the accompanying drawings, there is shown examples of the rectangular profile rifled PVO or PVCO pipes that comprise graphene or graphene oxide or any other graphene material. The cross-section of the outer surface of the rectangular profile of the pipes, Ei-ii and Fi-ii, may either be a rectangular cross-section Ei-ii or round cross-section Fi-ii. The inner surface of the pipes, which faces the bore of the pipes, comprises graphene or graphene oxide or any other graphene material and comprise rectangular-shaped grooves 15*a-b* and 16*a-b* that continuously run throughout the length of the pipe in a spiral motion around the bore axis line 17*a-b* and 18*a-b*. The twist rate of these continuous spiral grooves varies including, but not limited to, 1:5 inch or 1:10 inch or 1:48 inch constant twist rates or any other constant twist rates. Alternatively, the twist rate of the said continuous spiral grooves may have a gain twist rate.

The said rectangular profile may have three grooves 15*a* and 16*a* or eight grooves 15*b* and 16*b* or any other number of grooves, depending on the dimensions of the pipes. The grooves 15*a-b* and 16*a-b* may comprise U-shaped three-walled (in cross section) grooves comprising one horizontal wall 19*a-b* and 20*a-b* that is perpendicular to two parallel vertical walls 21*a-b* and 22*a-b*. The horizontal walls 19*a-b* and 20*a-b* of the grooves are longer in dimension than the vertical walls 21*a-b* and 22*a-b*. The dimensions of the grooves vary according to the dimensions of the pipes.

The longitudinal sections of the rectangular profile, Gi-ii and Hi-ii, show the rifled PVC or PVCO pipes that comprise graphene or graphene oxide or any other graphene material. The continuous spiral rectangular shaped grooves facing the bore axis lines are shown at 23*a-b* and 24*a-b*. The rectangular shaped cross sections of the grooves are also shown, the horizontal wall being longer in dimension than the vertical walls.

Figure 3:
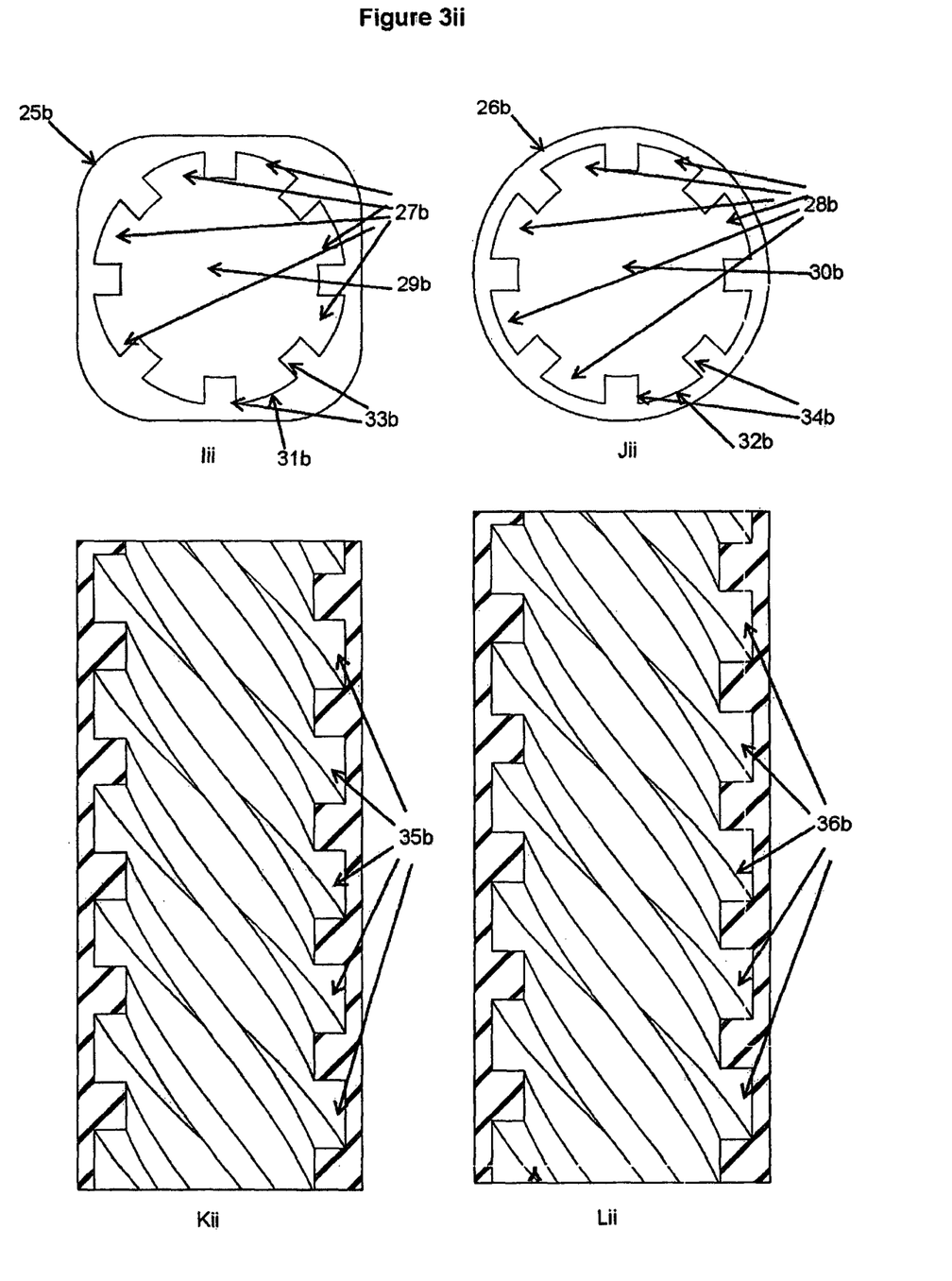
Figure 3I:
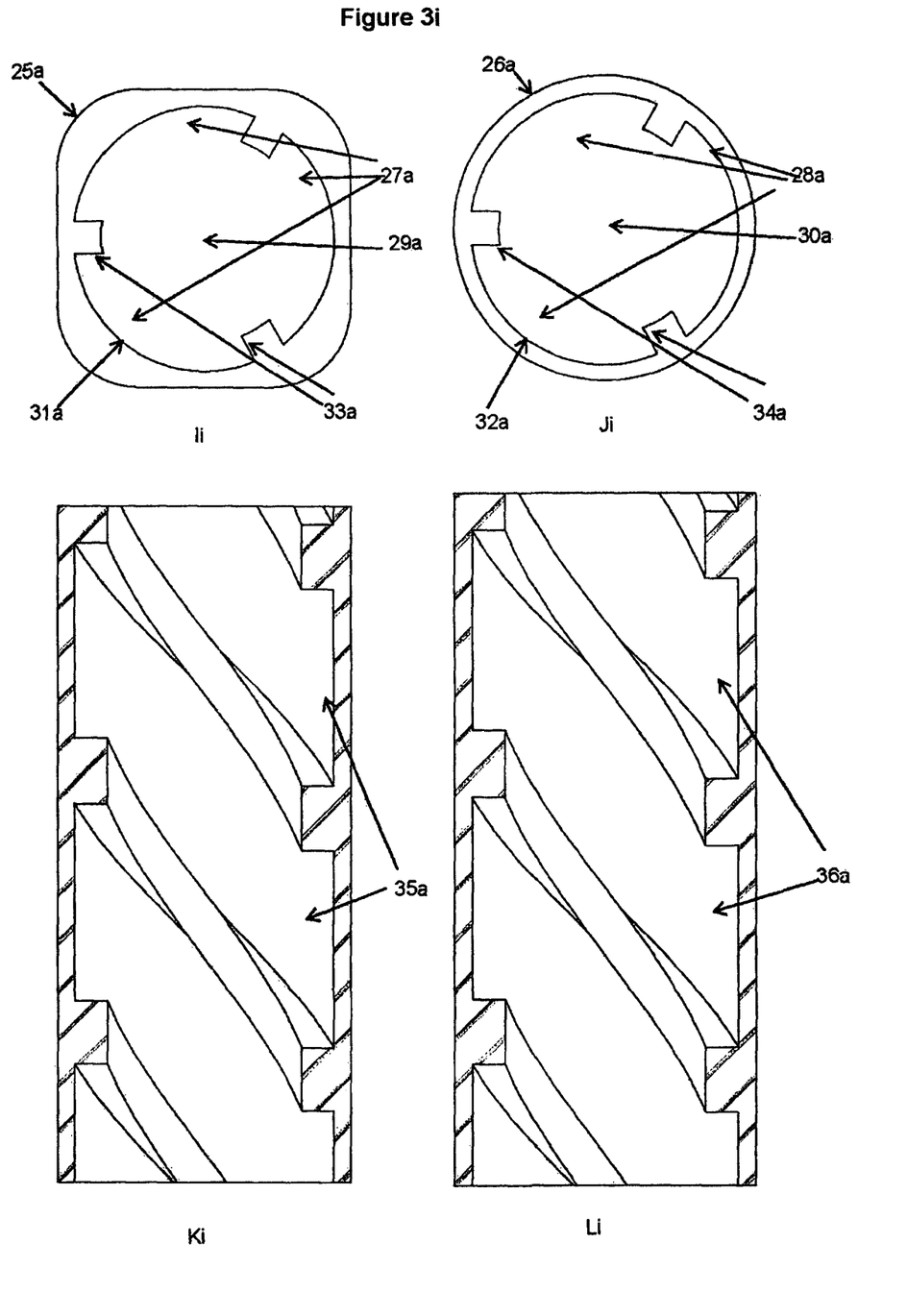
FIG. 3*i* is a diagrammatic representation of cross sections and longitudinal sections of a 3-grooved semi-triangular profile graphene or graphene oxide or any other graphene material containing rifled PVC or PVCO pipe in accordance with the present invention.

Referring to FIGS. 3*i* and 3*ii* of the accompanying drawings, there is provided examples of the semi-triangular profile of the rifled PVO or PVCO pipes that comprise graphene or graphene oxide or any other graphene material. The cross-section of the outer surface of the pipes, Ii-ii and Ji-ii, may either be a rectangular cross-section Ii-ii or round cross-section Ji-ii. The inner surface of the pipes, which faces the bore of the pipes, comprises graphene or graphene oxide or any other graphene material and comprises convergent three-walled (or half triangle) shaped 27*a-b* and 28*a-b* grooves that continuously run throughout the length of the pipe in a spiral motion around the bore axis line 29*a-b* and 30*a-b*. The twist rate of the said continuous spiral grooves in this semi-triangular profile varies including, but not limited to, 1:5 inch or 1:10 inch or 1:48 inch constant twist rates or any other constant twist rates. Alternatively, the twist rate of the said continuous spiral grooves may have a gain twist rate.

The semi-triangular profile may have three grooves 27*a* and 28*a* or eight grooves 27*b* and 28*b* or any other number of grooves, depending on the dimensions of the pipes. The grooves 27*a-b* and 28*a-b*, may comprise U-shaped three-walled (in cross section) grooves comprising one horizontal wall 31*a-b* and 32*a-b* that connects to two vertical walls 33*a-b* and 34*a-b* which are at acute angle forming a semi-triangular shape. The dimensions of the grooves vary according to the dimensions of the said pipe.

The longitudinal sections of the semi-triangular profile, Ki-ii and Li-ii, show the rifled PVC or PVCO pipes that comprise graphene or graphene oxide or any other graphene material. The continuous spiral semi-triangular shaped grooves facing the bore axis lines are shown at 35*a-b* and 36*a-b*. The semi-triangular shaped cross section of the said grooves are also shown.

Figure 4:
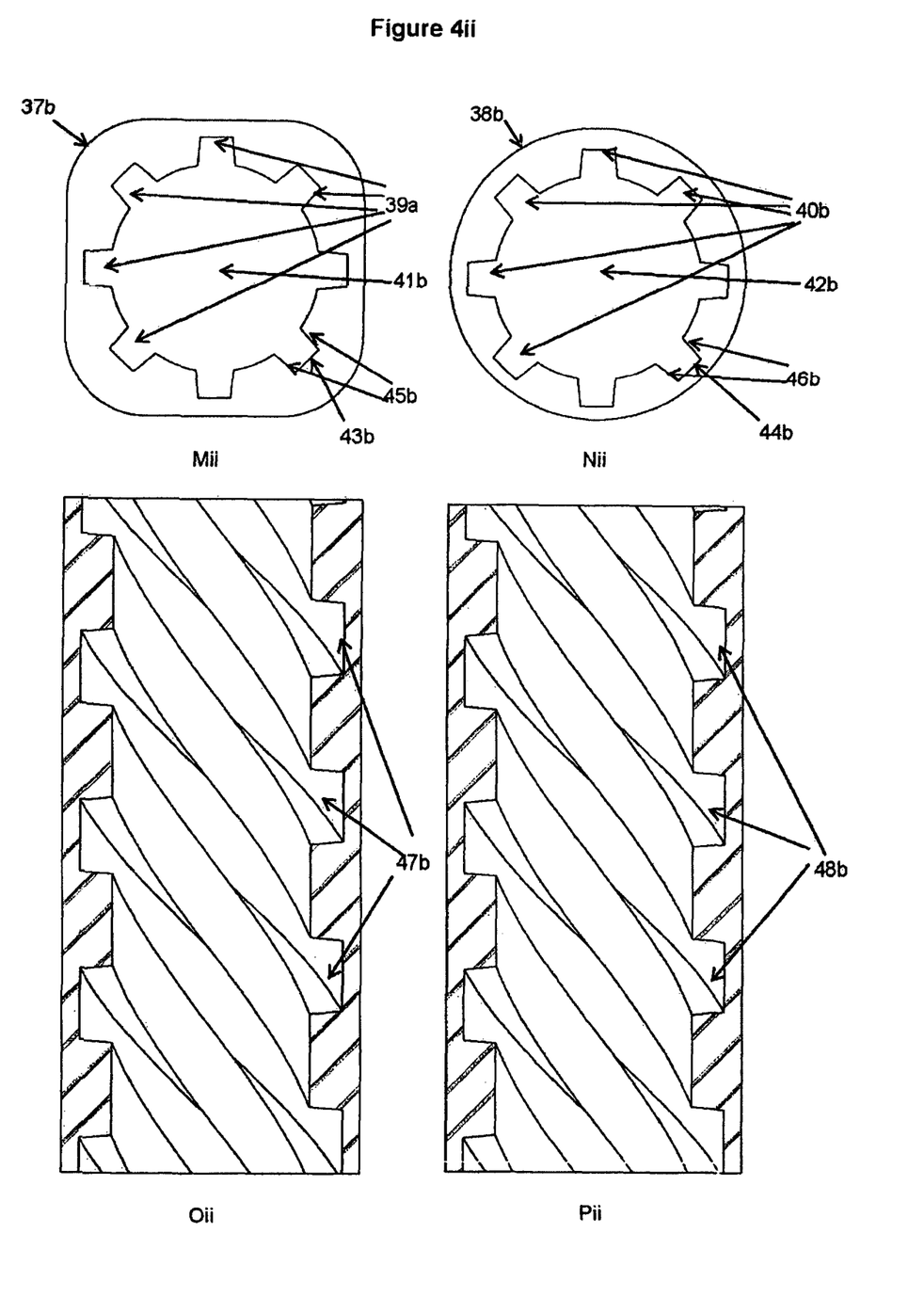
Figure 4I:
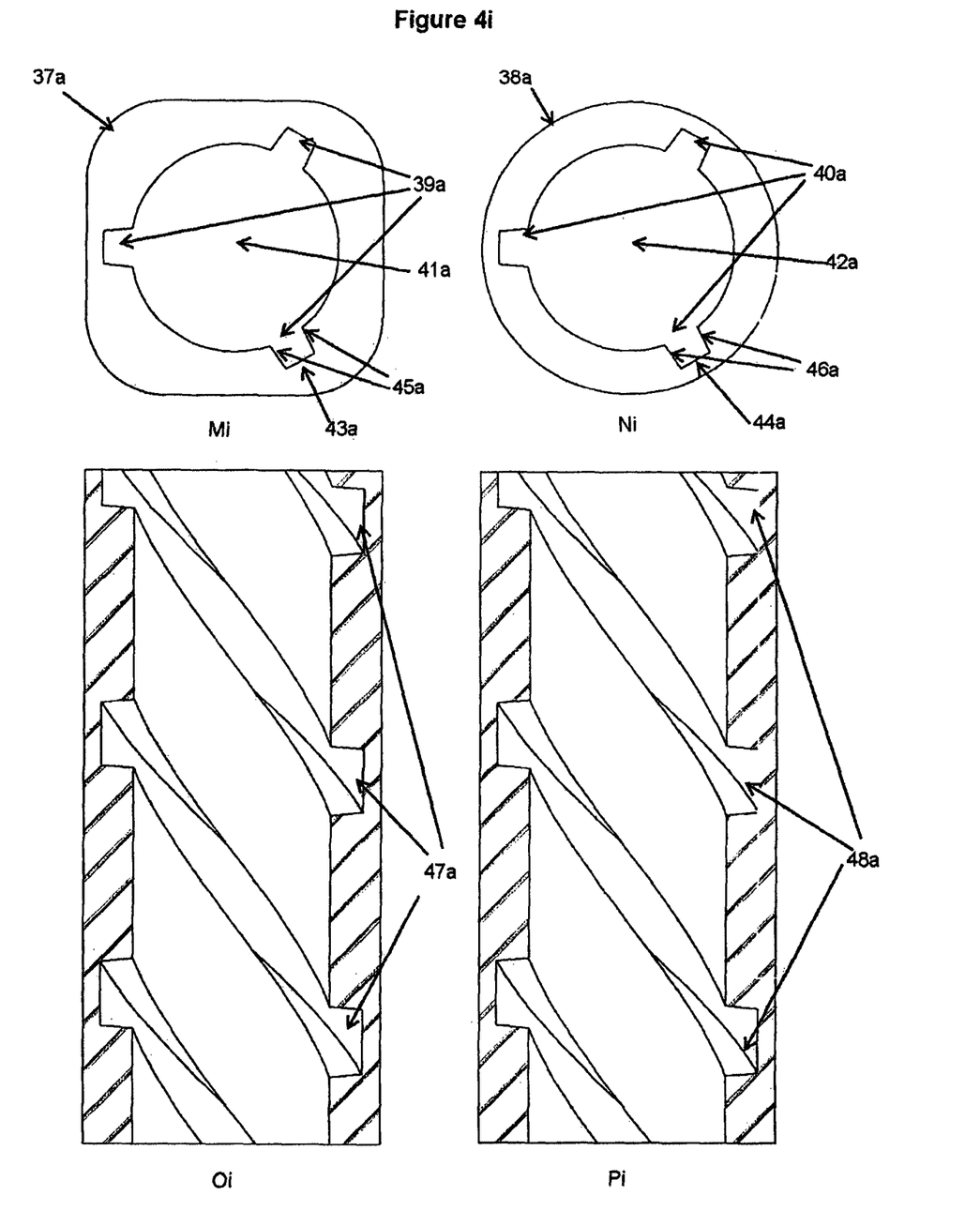
FIG. 4*i* is a diagrammatic representation of cross sections and longitudinal sections of three-grooved octagonal profile graphene or graphene oxide or any other graphene material containing rifled PVC or PVCO pipe in accordance with the present invention.

Referring to FIGS. 4*i* and 4*ii* of the accompanying drawings, there is provided examples of the octagonal profile of the rifled PVO or PVCO pipes that comprise graphene or graphene oxide or any other graphene material. The cross-section of the outer surface of the pipes, Mi-ii and Ni-ii, may either be a rectangular cross-section Mi-ii or round cross-section Ni-ii. The inner surface, which faces the bore of the said pipes, comprises graphene or graphene oxide or any other graphene material and comprises rectangular shaped grooves 39*a-b* and 40*a-b* that continuously run throughout the length of the pipe in a spiral motion around the bore axis line 41*a-b* and 42*a-b*. The twist rate of the said continuous spiral grooves in this octagonal profile varies including, but not limited to, 1:5 inch or 1:10 inch or 1:48 inch constant twist rates or any other constant twist rates. Alternatively, the twist rate of the said continuous spiral grooves may have a gain twist rate.

The octagonal profile may have, for instance, three grooves 39*a* and 40*a* or 8 grooves 39*b* and 40*b* 4*b* or any other number of grooves, depending on the dimensions of the pipes. The grooves 39*a-b* and 40*a-b* may comprise U-shaped three-walled (in cross section) grooves comprising one horizontal wall 43*a-b* and 44*a-b* and two vertical walls 45*a-b* and 46*a-b* which are at obtuse angles to the horizontal wall 43*a-b* and 44*a-b*. The dimensions of the grooves vary according to the dimensions of the pipes.

The longitudinal sections of the octagonal profile, Oi-ii and Pi-ii, show the rifled PVC or PVCO pipes that comprise graphene or graphene oxide or any other graphene material. The continuous spiral rectangular shaped grooves facing the bore axis lines are shown at 47*a-b* and 48*a-b*. The rectangular shaped cross-section of the grooves are also shown, the vertical walls being at obtuse angles to the horizontal wall in accordance to the present invention.

Figure 5:
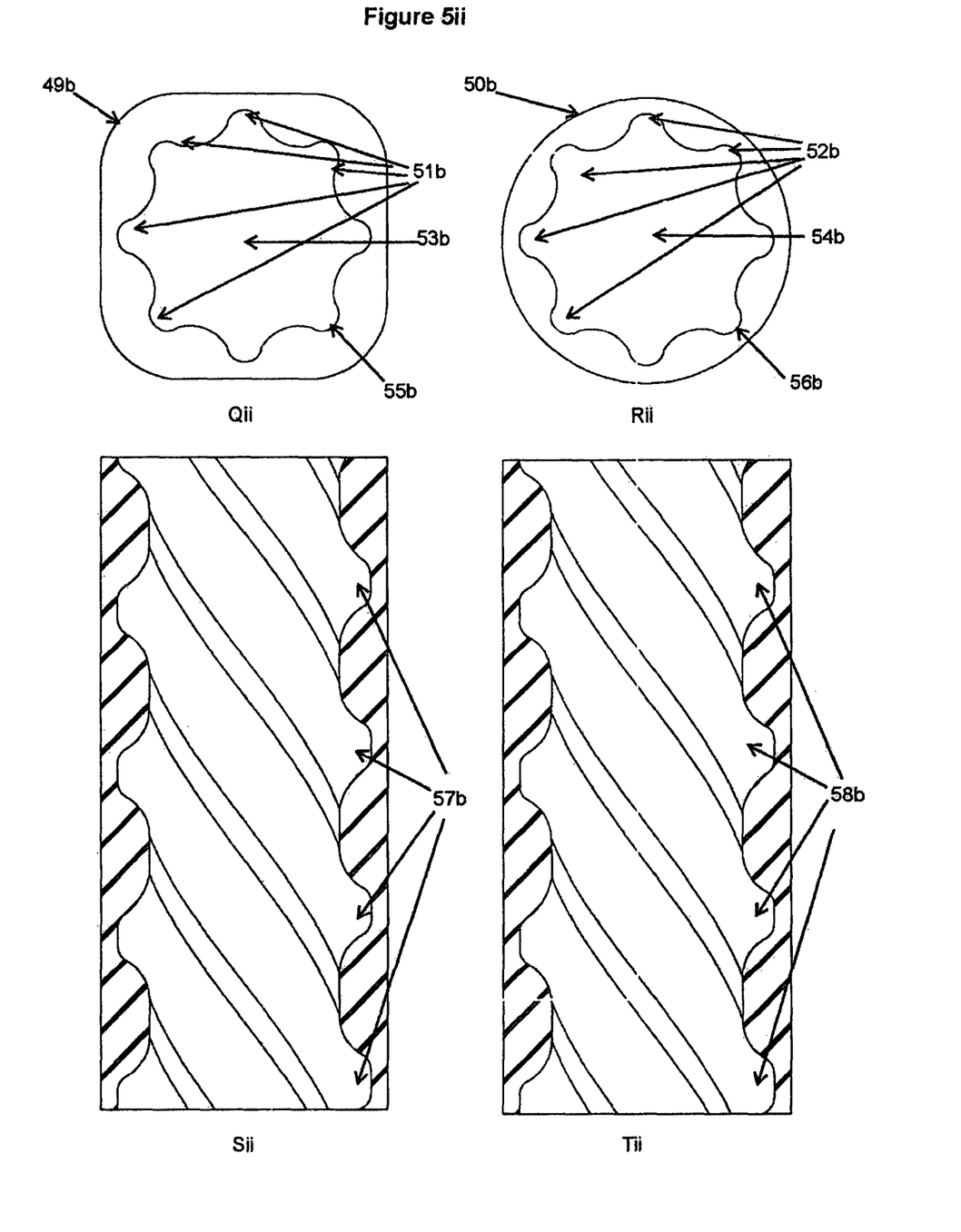
Figure 5I:
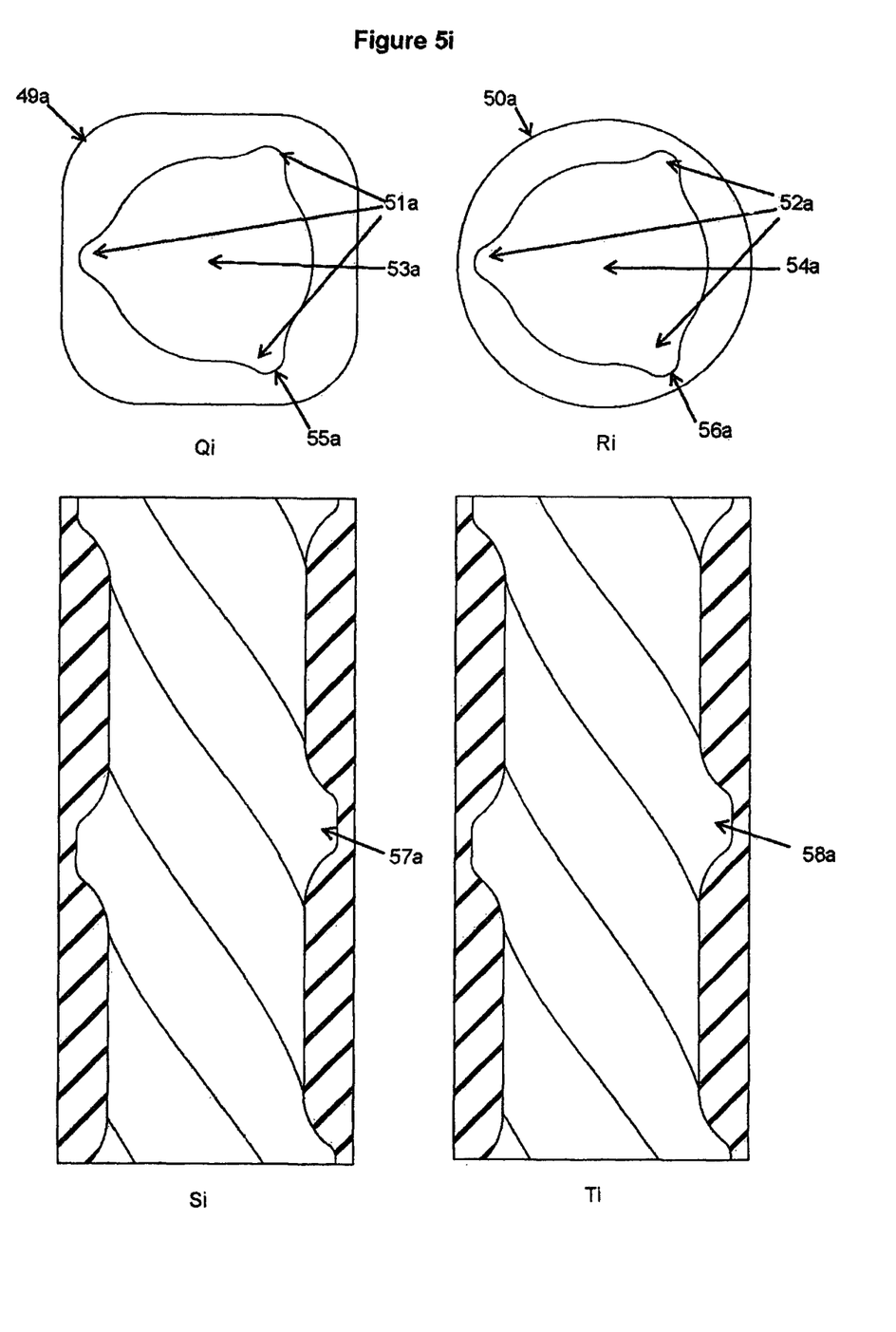
FIG. 5*i* is a diagrammatic representation of cross sections and longitudinal sections of three-grooved semi-circular profile graphene or graphene oxide or any other graphene material containing rifled PVC or PVCO pipe in accordance with the present invention.

Referring to FIGS. 5*i* and 5*ii* of the accompanying drawings, there is provided examples of the semi-circular profile of the rifled PVO or PVCO pipes that comprise graphene or graphene oxide or any other graphene material. The cross-section of the outer surface of the semi-circular profile, Qi-ii and Ri-ii, may either be a rectangular cross-section Qi-ii or a round cross-section Ri-ii. The inner surface of the pipes, which faces the bore of the said pipes, comprises graphene or graphene oxide or any other graphene material and comprise semi-lunar shaped grooves 51*a-b* and 52*a-b* that continuously run throughout the length of the pipe in a spiral motion around the bore axis line 53*a-b* and 54*a-b*. The twist rate of the said continuous spiral grooves in this semi-circular profile varies including, but not limited to, 1:5 inch or 1:10 inch or 1:48 inch constant twist rates or any other constant twist rates. Alternatively, the twist rate of the said continuous spiral grooves may have a gain twist rate.

The semi-circular profile may have three grooves 51*a* and 52*a* or eight grooves 51*b* and 52*b* or any other number of grooves, depending on the dimensions of the said pipes. The said grooves 51*a-b* and 52*a-b*, may comprise semi-lunar U-shaped (in cross section) grooves 55*a-b* and 56*a-b*. The dimensions of the said semi-lunar shaped grooves vary according to the dimensions of the said pipe.

The longitudinal sections of the semi-circular profile, Si-ii and Ti-ii, show the rifled PVC or PVCO pipes that comprise graphene or graphene oxide or any other graphene related materials. The continuous spiral semi-lunar shaped grooves facing the bore axis lines are shown at 57*a-b* and 58*a-b*.

Figure 6:
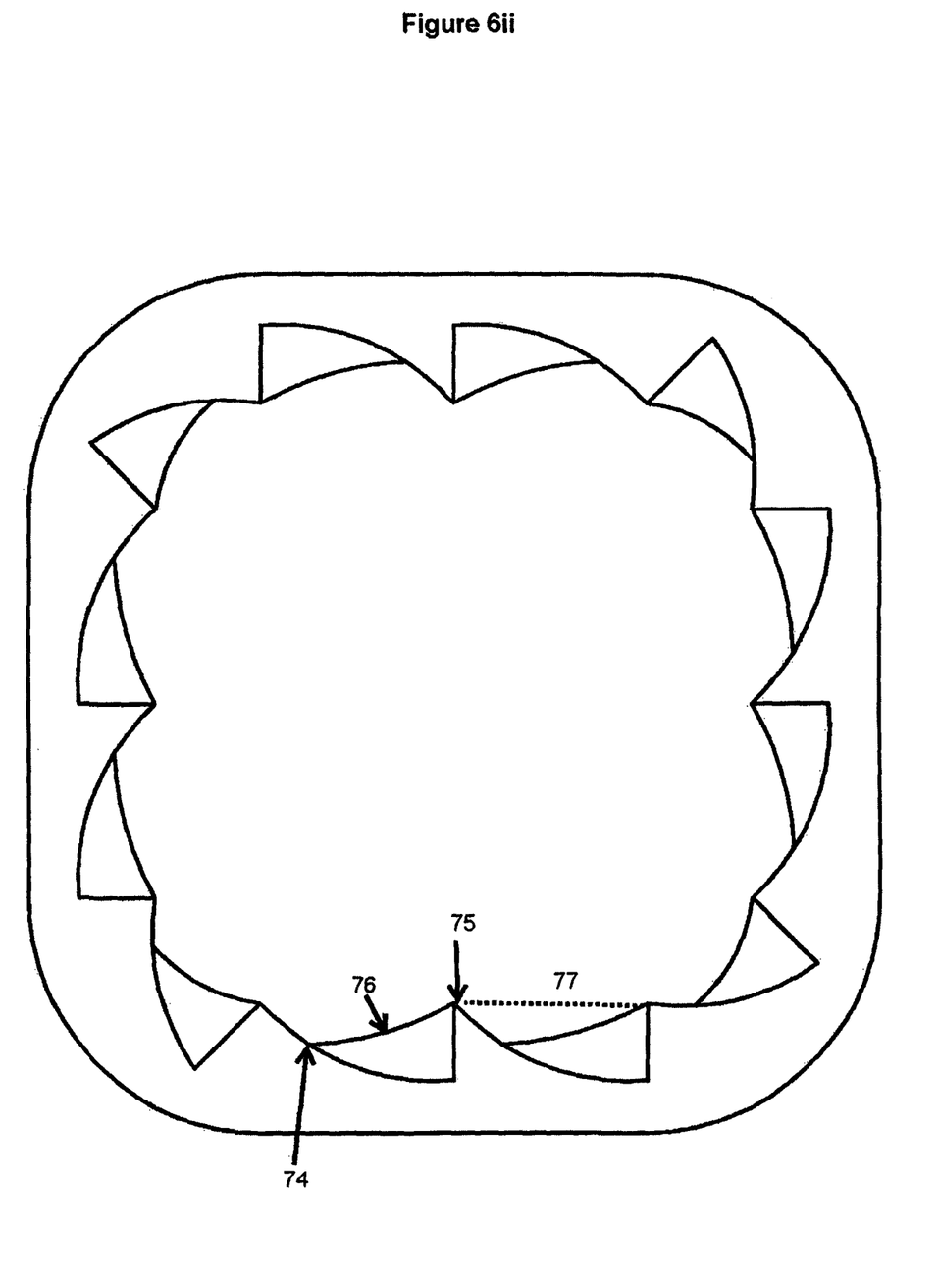
Figure 6I:
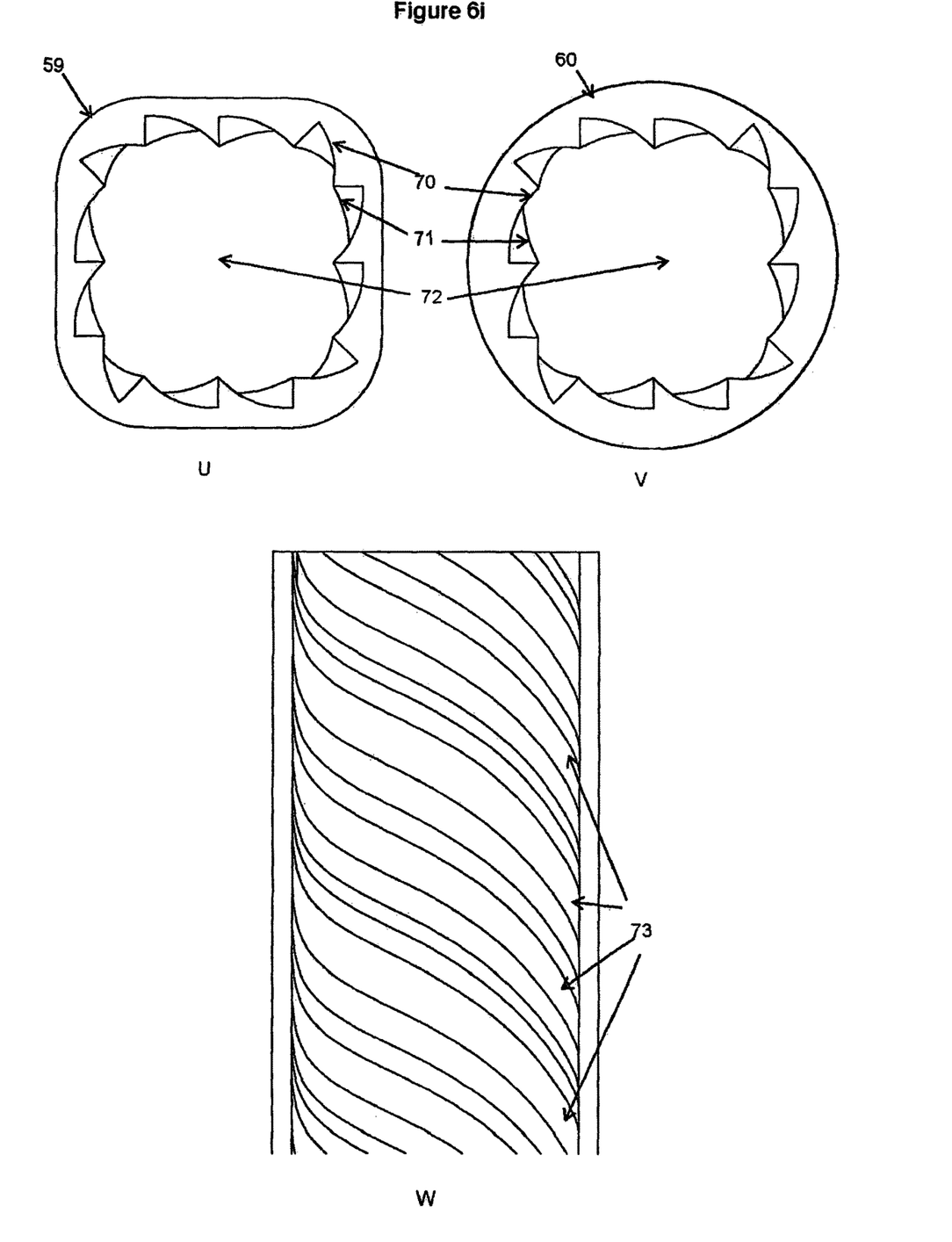
FIG. 6*i* is a diagrammatic representation of cross sections and longitudinal sections of a wave profile graphene or graphene oxide or any other graphene material containing rifled PVC or PVCO pipe in accordance with the present invention.

Referring to FIG. 6*i* of the accompanying drawings, there is provided examples of cross sections and longitudinal sections of the said wave profile of the rifled PVO or PVCO pipes that comprise graphene or graphene oxide or any other graphene material. The cross-section of the outer surface of the wave profile of the pipes, U and V, may either be a rectangular cross-section U or round cross-section V. The inner surface of the pipes, which faces the bore of the said pipes, comprises graphene or graphene oxide or any other graphene material and comprises continuous curvatures and grooves 70 and 71 that continuously run throughout the length of the pipe in a spiral motion around the bore axis line 72. The twist rate of the said continuous curvatures and grooves in this wave profile varies including, but not limited to, 1:5 inch or 1:10 inch or 1:48 inch constant twist rates or any other constant twist rates. Alternatively, the twist rate of the said continuous curvatures and grooves may have a gain twist rate.

The wave profile comprises the curvatures and grooves that cause the formation of sawtooth series of wave-like embodiments 70 and 71 in a spiral pattern throughout the inner surface of the said pipes. The said spiral wave-like embodiments could be arranged around the bore axis line 72 in a clockwise or anti-clockwise pattern. The number of the said curvatures and grooves depends on the dimensions of the said pipes. The dimensions of the said wave-like embodiments vary according to the dimensions of the said pipe.

The longitudinal section of the wave profile W shows the rifled PVC or PVCO pipes that comprise graphene or graphene oxide or any other graphene material. The continuous spiral wave-like shaped embodiments facing the bore axis lines are shown at 73.

Referring to FIG. 6*ii* of the accompanying drawings, there is provided examples of cross sections of the wave profile of the rifled PVO or PVCO pipes that comprise graphene or graphene oxide or any other graphene material. The shape of each of the said wave-like embodiments comprises four main elements: trough 74, crest 75, wave-height and wave-length. The trough 74 is the lowest point of the wave, the crest 75 is the highest point of the wave, the wave-height is the line connecting the trough to the crest and forms the leading surface 76 of the wave, and the wave-length is the horizontal line 77 connecting the tips of two consecutive waves. The tips of the wave crests are pointed towards the centre of the pipe. The shape of the positive ramp is concave with reference to the horizontal wave-length line while the negative ramp forms a steep edge that is perpendicular to the wavelength.

The invention claimed is:

1. A water delivery pipe made from PVC or PVCO and having an inner surface which is rifled, wherein the inner surface comprises a graphene material.

2. A pipe according claim 1, wherein the graphene material is graphene or graphene oxide.

3. A pipe according to claim 1, wherein the pipe has a circular or rectangular cross section.

4. A pipe according to claim 1, wherein the inner surface comprises grooves and lands arranged in a spiral configuration around the longitudinal axis of the pipe.

5. A pipe according to claim 4, wherein the grooves are rectangular in cross section.

6. A pipe according to claim 5, wherein the grooves are square in cross-section.

7. A pipe according to claim 4, wherein the grooves are semi-lunar in cross-section.

8. A pipe according to claim 4, wherein the grooves are semi-triangular in cross-section.

9. A pipe according to claim 4, wherein the grooves are octagonal in cross-section.

10. A pipe according to claim 4, wherein the grooves form a series of sawtooth wave-like arrangements having positive and negative ramps.

11. A pipe according to claim 10, wherein the positive ramps are concave in shape and the negative ramps have steep edges which are perpendicular to the wavelength.

12. A pipe according to claim 1, wherein rectangular shaped holes or punctures are provided along the pipe to which are attached drinking nipples.

13. A pipe according to claim 12, wherein the nipples are coated with graphene or graphene oxide or any other graphene related material.

14. A method of making a water delivery pipe made from PVC or PVCO and having an inner surface which is rifled, the method comprising providing a PVC or PVCO pipe and rifling the inner surface of the pipe, wherein, after the inner surface of the pipe is rifled, a graphene material is applied thereto.

15. A method according to claim 14, wherein the pipe is made by injection moulding or 3D printing.

16. A method according to claim 14, wherein the graphene material is applied to the inner surface of the pipe by a coating or doping process.

17. A method according to claim 15, wherein the pipe is made by a 3D printing process which comprises successive printing of PVC or PVCO layers, rifled PVC or PVCO layers and graphene material layers.

18. A method of making a water delivery pipe made from PVC or PVCO and having an inner surface which is rifled, the method comprising providing a PVC or PVCO pipe and rifling the inner surface of the pipe, wherein the pipe comprises a mixture of graphene material and PVC or PVCO such that the graphene material extends throughout the wall of the pipe.

19. A method according to claim 18, wherein the pipe is made by injection moulding a mixture comprising PVC or PVCO and the graphene material.

\* \* \* \* \*